June 18, 1957     W. A. WOLF     2,796,484
AUTOMOBILE HEADLAMP SWITCHING CONTROL
Filed May 18, 1955     2 Sheets-Sheet 1
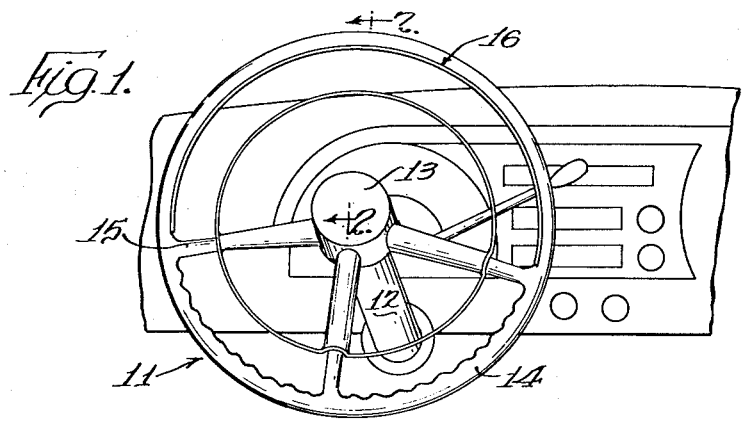
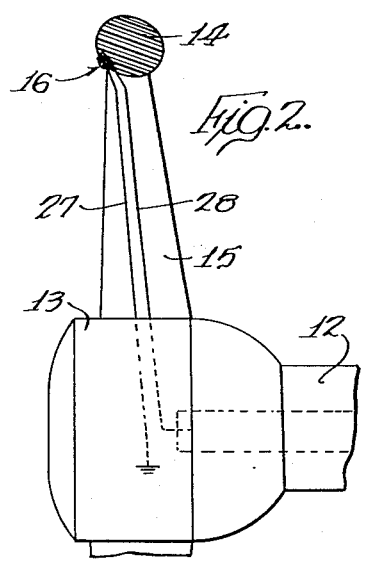
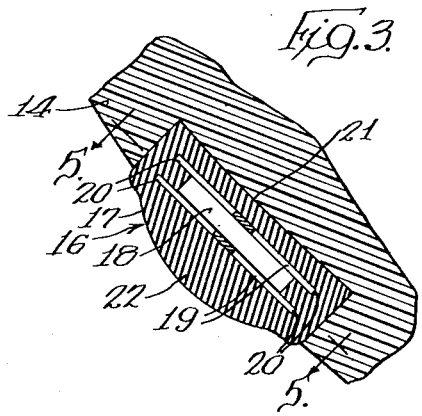
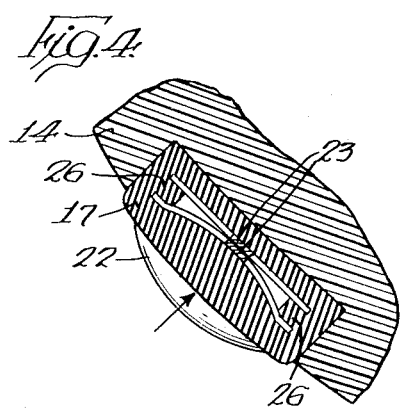
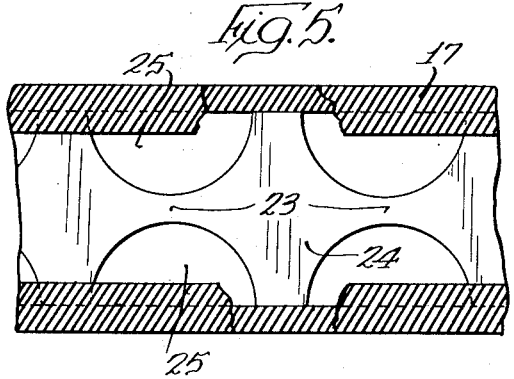
INVENTOR.
Walter A. Wolf
BY
Kegan and Kegan
Attys.

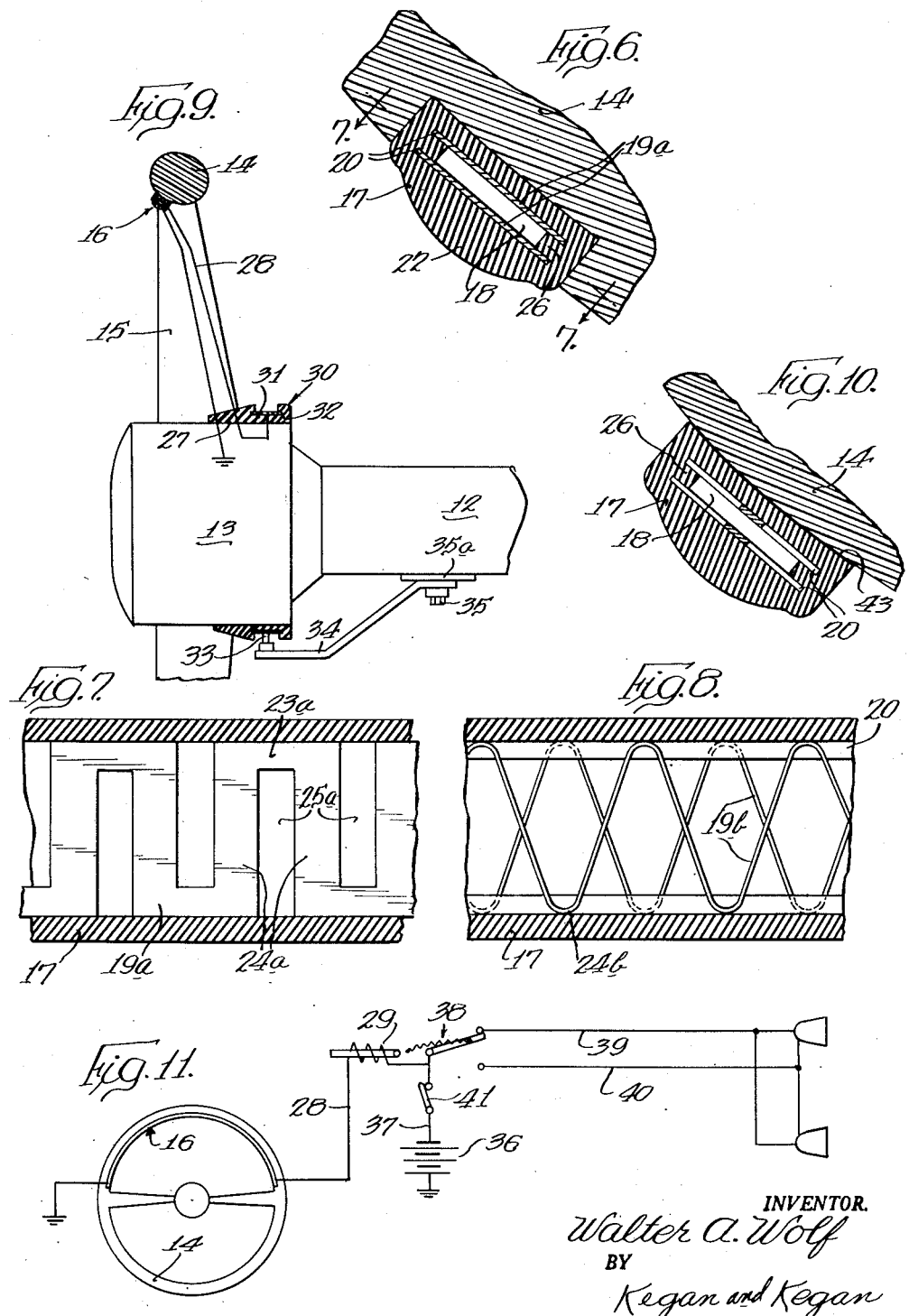

United States Patent Office 2,796,484
Patented June 18, 1957

2,796,484

AUTOMOBILE HEADLAMP SWITCHING CONTROL

Walter A. Wolf, Logansport, Ind., assignor to Switches, Inc., Chicago, Ill., a corporation of Indiana Application May 18, 1955, Serial No. 509,189

10 Claims. (Cl. 200—61.57)

This invention relates to automobile headlamps switching means and more particularly to a steering wheel mounted switching control for operating the headlamps from bright to dim and vice versa.

It is a main object of this invention to provide a convenient means for controlling headlamps by removing the headlamps switching control from the present day conventional floor position to the automobile steering wheel.

Another object of this invention is to provide an automobile headlamp control whereby the bright and dim headlamps may be selectively hand operated by the driver without moving the hand from the steering wheel.

A further object of this invention is to provide an automobile headlamp control which is conveniently mounted on the steering wheel, which is easy to operate, and yet which is so constructed as to prevent inadvertent and undesirable switching of the headlamps.

Still a further object of this invention is to provide a headlamp control means which is adapted to be mounted either in new steering wheels or which is easily mounted on existing steering wheels without requiring any special skills.

And, still a further object of this invention is to provide a headlamp switch control which is simple and durable in construction, and which is economical to produce.

These and other objects of the invention are achieved by the new headlamps switching control comprising a pair of contacts which are in the form of a strip and mounted in a resilient ribbon which serves to insulate the contact strips from each other and the rest of the steering wheel. The contact strips are each so constructed as to have a plurality of support sections imbedded in the ribbon so that pressure over a wide area of the ribbon will be distributed evenly over a plurality of the supports without causing the strips to touch, while a slight pressure over a concentrated area will close an electrical circuit between the contact strips to switch the headlamps. The body of each strip further has a configuration which permits bending or flexing of the strips in any desired plane. Thus, the strips and ribbon may easily be made to follow the configuration or contour of the steering wheel.

The foregoing and other objects, advantages and features of construction are disclosed hereinafter in detail with the accompanying drawings.

In the drawings:

Figure 1 is a view from the driver's position showing a steering wheel with the switch control mounted thereon;

Figure 2 is a sectional view through a steering wheel showing the switching control and electrical connections mounted thereto;

Figure 3 is an enlarged sectional view through a part of the steering wheel, showing the ribbon and one form of contact strips mounted therein;

Figure 4 is a view similar to Figure 3, showing the contact strips touching;

Figure 5 is a sectional view taken along lines 5—5 in Figure 3;

Figures 6 and 7 are views similar to those shown in Figures 3 and 5, but showing a modified form of contact strips;

Figure 8 is still another modification of the contact strips;

Figure 9 is a view similar to Figures 3 and 6, but showing the switch control mounted on the steering wheel and another method of making the electrical connections to the contact strips;

Figure 10 is a view similar to that shown in Figure 3, but showing an enlarged section of the ribbon mounted as shown in Figure 9; and Figure 11 is a circuit diagram showing in a schematic way one preferred form of circuits with certain mechanisms constructed and arranged in accordance with the invention.

As shown in Figure 1, the automobile steering mechanism indicated generally at 11, comprises a steering column 12, a hub 13, which is secured to the steering column by conventional means such as bolting, and a steering wheel 14 mounted on the hub by means of spokes 15. The switching controls 16 are preferably upon the upper and inner face of the steering wheel, since this location seems to be most convenient, and since there is little probability that the normal position of the driver's hand, which normally rests on the upper and outer face of the steering wheel, will inadvertently put such pressure on the switching control as to cause undesirable switching of the headlamps. The switching control 16 may extend around the entire steering wheel, it may extend only around a portion of the steering wheel, as shown in Figure 1, or it may be positioned on any other portion of the steering wheel as desired.

The switching control can either be built into the steering wheel, and thus become an integral part of the wheel, as shown in Figure 2, or it may be mounted on the wheel as an attachment, as shown in Figure 9. When used as a part of an original or new wheel, the wheel is first formed with a groove adapted to accommodate the switching control. When the control is intended to be used on an existing wheel, the wheel may be milled out to form a groove to accommodate the control means or the control means may be mounted directly upon the wheel. The latter method of mounting the switching control on existing wheels is preferable, however, since anyone would then be able to mount the control on the wheel without any special skill involved.

Referring to Figures 3, 4 and 5, the switching control is made up of a resilient tubular ribbon-like member 17 having a cored portion 18 of generally rectangular cross section in which a pair of contact strips 19—19 are mounted. Extending from each corner of the rectangular hollow portion 18 is a slit 20, which is continuous over the length of ribbon 17. The slits are paired so as to provide a support means for each contact strip 19—19, as hereafter described. The back portion 21 of the ribbon is curved slightly so that if the switching means is mounted on the face of the steering wheel the ribbon will easily conform to the configuration of the steering wheel. The front face 22 of the ribbon is formed to provide a cushion which requires a certain degree of pressure before the cushion is sufficiently compressed to bring the contact strips 19—19 together. Ribbon 17 is preferably formed from a non-conducting resilient material such as rubber. In manufacture, the ribbon 17 preferably is made by a continuous extruding process which permits the rapid production of a uniform ribbon throughout. The ribbon is then cut to the length desired or it may be retained in its entirety until the contact strips are inserted therein, and then cut to the desired length. After the strips 19—19 are inserted into ribbon 17, a short piece of fiber or other insulating material is inserted into each end of the cored passage, surrounding the electrical connections to the strips, while plugging the passage.

Each strip 19 comprises a central portion 23 and a series of support or bridge portions 24, formed by making a plurality of aligned cut-out portions 25 on each side of the strip. The cut-out portions are generally of semicircular shape. When each strip 19 is inserted into a pair of slits 20 in the ribbon, bridge portions 24 provide sufficient support to hold the respective strips therein, while portions 26 of the insulating ribbon provide means to insulate the strips from each other. By making each strip approximately ¼ inch across, it has been found that the switching means may be conveniently placed on the steering wheel without becoming obtrusive. Further, by making the cut-out portions approximately ³⁄₁₆ inch in diameter and on approximately ¼ inch centers, it has been found that the strips will have a sufficient number of supporting bridges to uniformly distribute the force applied by a pressure over a substantial area of the ribbon face 22 without causing the strips 19—19 to contact each other. On the other hand, if the force is applied to a concentrated area, such as by the pressure caused by a thumb pressing on the ribbon face 22, as shown in Figure 4, the pressure so applied will cause the strips to contact at their central portions 23. Thus, even if the driver does inadvertently apply pressure with his entire hand to the switching control means, such as might occur under heavy traffic conditions which might cause the driver to tense up, the pressure so applied by the hand will be uniformly distributed over the ribbon sufficiently by the bridge portions 24 so that the strips will not undesirably contact and cause switching of the headlamps.

The strips 19—19 when mounted in the ribbon need not have their respective cut-out portions aligned, since central portions 23 provide continuous contact areas. Further, the central portions of each strip are of such dimensions as to permit the strips to be flexed or bent in any plane. This is highly desirable, since this permits each strip to be bent out of its own plane so that the strips may be placed on the steering wheel as desired and still follow the cross-sectional configuration of the wheel, while also being able to be flexed to follow the circumferential contour of the wheel.

Figures 6 and 7 show a modified form of contact strip having equal flexibility to follow the steering wheel contour and the same ability to resist inadvertent switching as that possessed by the strips shown in Figures 3–5. The modified strips 19a—19a also are formed by a stamping operation wherein the bridging portions 24a are made larger in breadth than the spaces or cut-out portions 25a. Such a design eliminates the necessity of having to align the strips when they are mounted in the ribbon, since some part of each bridge portion of one strip is always overlapping with the bridging portions of the other strip. The bridging portions 24a, which run substantially perpendicular to the major axis of the strip, are interconnected by portions 23a alternatively positioned at the strip side. The zigzag strip design achieved by such an arrangement enables the strip to have a high degree of flexibility, whereby it easily follows the contour of the steering wheel.

Figure 8 discloses another modification of the strips. Each modified strip 19b—19b comprises a continuous wire which takes the form of a sinusoidal pattern wherein each directional change of the wire serves to provide individual bridge portions 24b for supporting the strip in resilient ribbon 17. Grooves 20 are provided in the ribbon for insulatingly mounting each strip 19b—19b, with gap 18 and ribbon casing portion 26 insulating the strips from each other. A cushion portion 22 also is provided on the face of ribbon 17.

Ribbon 17, when used with strips 19b—19b, is formed by any well known extrusion process for making insulating casing from such materials as soft vinyl plastic or rubber. During the ribbon forming process, the strips 19b—19b are inserted into the ribbon casing with the strips being secured therein by their respective bridge portions 24b being held within the grooves 20. The same method of forming the switching control also may be employed when using strips 19 or 19a.

Since each strip 19b—19b is shaped from a continuous wire formed to present a sinuous pattern, the strips may be made to follow a smaller radius of curvature. Having properties similar to that of a spring coil, one side of each strip may expand while the other side remains much the same as when the strip is straight, or the other side may even compress slightly. This is highly advantageous since the switching control means may be mounted on the wheel to follow its circumferential contour, or the contour of objects having even smaller circumferences without putting any undue stress on the strips. Moreover, the strips 19b—19b, since they comprise many flexible wire portions, are easily bent out of their own plane to follow the cross-sectional configuration of the wheel whereon they are mounted.

Strips 19, 19a and 19b are desirably made of spring temper Phosphor bronze, berillium copper, or any other spring temper conductive metals.

The same switching control construction may be used in the steering wheel whether it be a new wheel, a converted wheel, or it may be used with a wheel upon which the switching means is mounted. Figures 3 and 6 show the switching control mounted on a new wheel or one which has been converted or modified to accommodate the ribbon within the configuration of the steering wheel. Figures 9 and 10 show the same switching means with the ribbon mounted on the outside of the wheel by means of an adhesive 43. The adhesive may either be provided on the back 21 of the ribbon 17, or it may be supplied separately in a container and applied at the time the ribbon is mounted upon the wheel. It is understood, of course, that any of the forms of strips shown herein may be used with the ribbon, whether it be mounted in a grooved wheel or on the outside of the wheel as shown in Figure 10.

Referring to Figure 2, one contact strip is connected to the electrical circuits of the automobile through lead 27, which is grounded, while the other strip is connected through a lead 28 to an appropriate latching relay 29. The leads are brought from the contact strips through the spokes 15 which are desirably cored, enabling the leads to be brought to the steering hub 13 without showing. As shown in Figure 2, the lead 28 is extended through the steering column 12 to the electrical circuitry of the automobile. When it is found that the spokes 15 are not cored, lead 28 may be brought to hub 13 by attaching it to the underside of one spoke by conventional means, such as by taping.

Where the construction of the steering column 12 is such that the leads cannot be brought down through the central portion of the steering column without encountering much difficulty, an external slip ring structure 30 may be mounted on the hub 13. Referring to Figure 9, the slip ring structure comprises a conductive ring 31 insulatingly mounted on the hub by mounting means 32. Line 28 then is connected to ring 31, which is engaged by brush contact 33. Brush 33 is mounted on the underpart of the steering column by a mounting pad 35a. A bolt 35 holds pad 35a and bracket 34 rigid to column 12. From contact 33, the electrical connection then may be conveniently made to relay 29 by means of a connecting line attached to the underpart of the steering column where it will not be seen.

Referring to Figure 11, in operation, closing of the gap between the contact strips completes a circuit from the automobile battery 36 through line 37 to energize coil 29. Energization of the coil 29, in turn actuates the latching relay 38 and either completes a circuit from battery 36 to the conductor 39 or to the conductor 40 to operate either the bright or dim headlamps as desired. A light switch 41 is inserted into line 37 to prevent operation of the lights and switching control when their use is not required.

The particular arrangement of installing the switching means on the steering wheel, and of connecting it to the switching relay, depends, of course, on the specific steering wheels and columns encountered. Thus, it may be desirable to, for example, use a steering wheel with the switching control means mounted therein as shown in Figure 2 with slip ring means connecting the contact strips to the electrical circuitry, as shown in Figure 9. Furthermore, while the preferred forms for connecting the switching means control to the automobile electrical circuitry is shown herein, the use of other connecting means is contemplated within the scope of this invention.

I claim:

1. An automobile headlamp switching control comprising a steering wheel rim, a resilient ribbon mounted on said rim, a front longitudinal cushion portion on said ribbon compressible by driver hand pressure, a cored central passage extending substantially the length of said ribbon, and a pair of flexible contact strips insulatingly mounted from each other on opposed sides of said passage and extending the length thereof, each of said strips including spaced portions bridging the width of said passage and having ends embedded in the body of said ribbon to effect strip support, said strips being engageable upon application of pressure anywhere along said cushion to close the necessary electrical circuitry for switching the headlamps.

2. An automobile headlamp switching control comprising, in combination, a steering wheel; a resilient ribbon mounted on said wheel, said ribbon having a front longitudinal cushion portion, a cored longitudinal central portion of substantially rectangular cross-section, and substantially parallel longitudinal slits extending from each cross-sectional corner; a first contact strip having spaced portions bridging the width of said ribbon central portion, said spaced portions having sufficient span to enter paired slits so as to locate said first strip on one wall forming said cored central passage; a second resilient contact strip superposed and normally spaced from said first strip and arranged to contact said first strip and close an electrical circuit, said second strip having spaced portions bridging the width of said ribbon central portion, the spaced portions of said second strip having sufficient span to enter other paired slits so as to insulatingly locate said second strip on an opposed wall forming said cored central passage, whereby pressure over an extended area of said cushion is distributed through said bridging portions sufficiently so as to prevent contact by said strips, while pressure over any concentrated area of said cushion flexes said second strip to cause contact between it and the first strip and complete electrical circuitry for switching the automobile headlamps from bright to dim and vice versa.

3. The switching control as described in claim 2 wherein each strip is a flat coil comprising a continuous wire arranged in sinusoidal pattern.

4. The switching control as described in claim 2 wherein said bridging portions of each strip are formed by a series of uniformly spaced cut-out portions in each strip side, and additionally including in each strip a narrow longitudinal portion connecting the bridge portions, whereby the strips are capable of being flexed in any plane.

5. Apparatus as described in claim 4 wherein each cut-out portion on one side of each strip is aligned with a like cut-out portion on the other side of the same strip, thereby forming in each strip a narrow central longitudinal portion comprising the strip body.

6. Apparatus as described in claim 4 wherein said bridging portions have greater width than said cut-out portions, thereby assuring contact between the paired strips.

7. A steering wheel mounted circuit closer for switching automobile headlamp from bright to dim and vice versa, comprising a resilient ribbon annularly mounted on the steering wheel rim and having a hollow passage extending substantially the length thereof, said passage being rectangular in cross-section and having slots extending transversely from the cross-sectional corners, said slots being parallel to each other and along the entire length of said passage; a front cushion portion along the length of said ribbon; and a pair of electrical contact strips, each approximating the length of said passage and comprising a continuous flexible wire formed as a sinusoidal flat coil, the directional changes of said sinusoidal coil providing a plurality of bridge portions, adjacent bridge portions being adapted to enter opposed slots and insulatingly mount the strips on opposed walls forming said passage, said strips being engageable upon a slight concentrated pressure anywhere along said cushion portion to close the necessary circuit for switching the headlamps.

8. The switching control as described in claim 2 wherein each of said strips comprises a metallic web and wherein said bridging portions of each of said strips are formed by a series of uniformly spaced semi-circular sections cut out at each edge of said web, paired cut-out sections at the web sides being aligned but of such radius as to not intersect each other to thereby provide a narrow central longitudinal portion connecting said bridging portions.

9. The switching control as described in claim 2 wherein said bridging portions of each strip are formed by a series of uniformly spaced cut-out portions in each strip side, alternate cut-out portions being provided at opposed sides of each strip, and said bridging portions of each strip having a width greater than said cut-out portions, thereby assuring contact between the paired strips.

10. A circuit closer mountable to the steering wheel of an automobile for switching the headlamps thereof from bright to dim and vice versa, comprising: a resilient ribbon mountable on said wheel, having a front longitudinal cushion portion and a cored longitudinal passage, said cushion and said passage each extending substantially the length of said ribbon, said passage being rectangular in cross-section and having substantially parallel longitudinal slits extending from each cross-sectional corner, and a pair of electrical contact strips, each approximating the length of said passage and comprising a plurality of uniformly spaced bridge portions provided interleaved between a series of uniformly spaced cut-out portions, said bridge portions having sufficient length to span the width of said passage and enter paired slits and thereby insulatingly mount said strips on opposed walls of said passage, said strips being engageable upon a slight concentrated pressure on said cushion portion to close the necessary circuit for switching the headlamps.

References Cited in the file of this patent

UNITED STATES PATENTS

| Re. 18,507 | Morris | June 28, 1932 |
| 1,066,432 | Kettering | July 1, 1913 |
| 1,292,030 | Parissi | Jan. 21, 1919 |
| 1,435,692 | Blackburn | Nov. 14, 1922 |
| 1,915,292 | Conklin | June 27, 1933 |
| 2,025,977 | Getty | Dec. 31, 1935 |
| 2,575,926 | Murray | Nov. 20, 1951 |

FOREIGN PATENTS

| 247,961 | Great Britain | June 17, 1927 |